United States Patent [19]
Fukami et al.

[11] Patent Number: 4,630,272
[45] Date of Patent: Dec. 16, 1986

[54] ENCODING METHOD FOR ERROR CORRECTION

[75] Inventors: Tadashi Fukami; Kentaro Odaka; Shinya Ozaki, all of Kanagawa, Japan

[73] Assignee: Sony Corporation, Tokyo, Japan

[21] Appl. No.: 604,537

[22] Filed: Apr. 27, 1984

[30] Foreign Application Priority Data

Apr. 30, 1983 [JP] Japan ................................. 58-77260

[51] Int. Cl.⁴ ............................................ G06F 11/10
[52] U.S. Cl. ......................................... 371/37; 371/38
[58] Field of Search ...................... 371/37, 50, 38, 39, 371/40

[56] References Cited

U.S. PATENT DOCUMENTS

| 4,044,328 | 8/1977 | Herff | 371/50 |
| 4,375,100 | 2/1983 | Tsuji | 371/50 |
| 4,435,807 | 3/1984 | Scott | 371/50 |

FOREIGN PATENT DOCUMENTS

| 0048152 | 9/1981 | European Pat. Off. |
| 0048151 | 9/1981 | European Pat. Off. |
| 0048150 | 9/1981 | European Pat. Off. |
| 0053505 | 11/1981 | European Pat. Off. |
| 0102533 | 4/1983 | European Pat. Off. |
| 0093969 | 4/1983 | European Pat. Off. |
| 2061575 | 10/1980 | United Kingdom |

Primary Examiner—Michael R. Fleming
Attorney, Agent, or Firm—Lewis H. Eslinger; Alvin Sinderbrand

[57] ABSTRACT

An encoding method for error correction of digital information data is provided. The encoding method comprises the steps of arranging the digital information data in a plurality of blocks each including a plurality of symbols, and generating first redundacy data from first respective groups of digital information data constituting symbols which exist in at least two blocks in a first direction. Second redundancy data is generated from second respective groups of digital information data constituting symbols which are included in the plurality of blocks in a second direction. First code sequences are formed for first error detection from the first digital information data groups and the first redundancy data, and second code sequences are formed for second error detection from the second digital information data group and the second redundancy code. Blocks including at least one of the digital information data and the first redundancy data are transmitted, and blocks including the second redundancy data are also transmitted.

19 Claims, 12 Drawing Figures

Fig. 2A

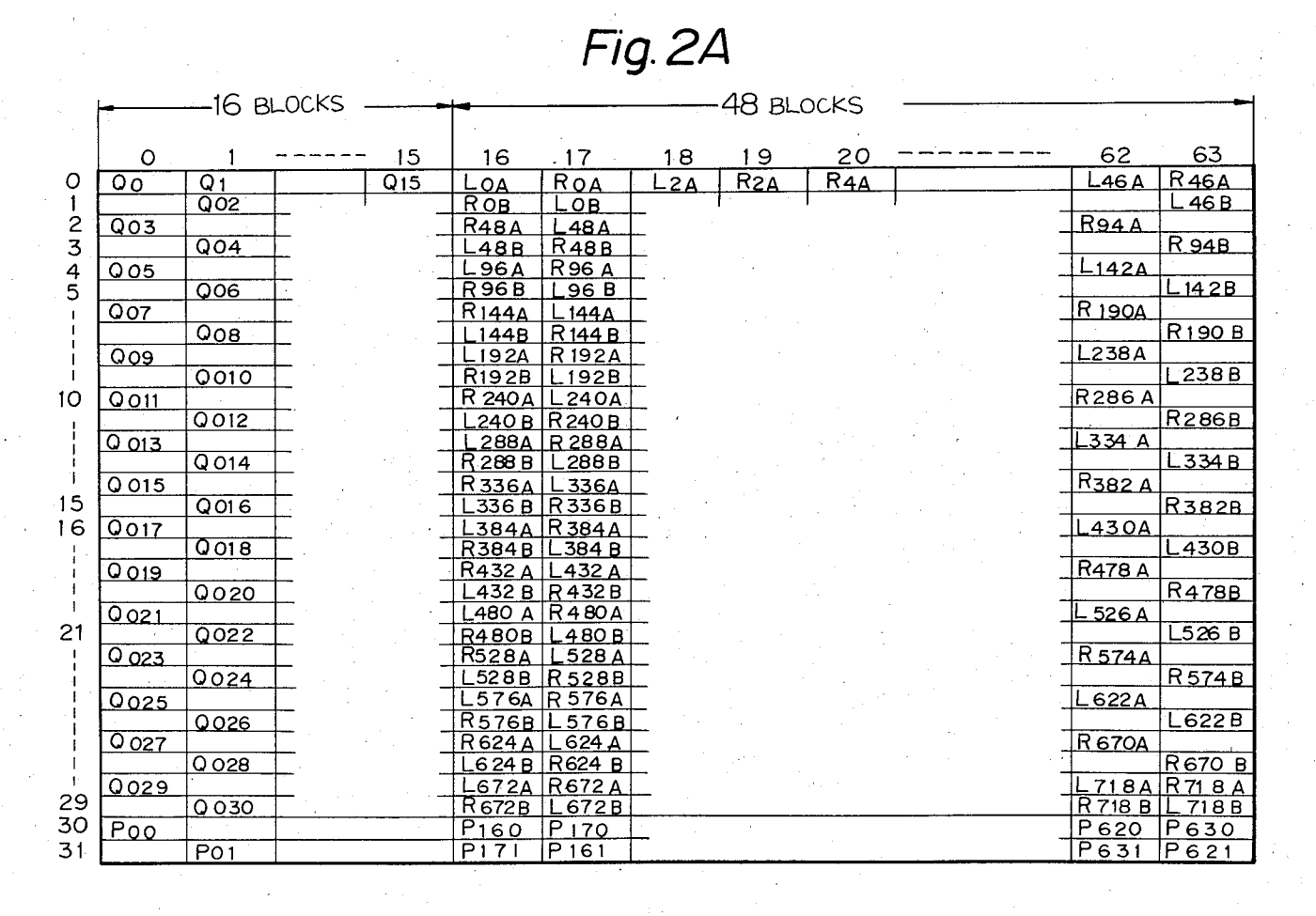

|   | 0 | 1 | ... | 15 | 16 | 17 | 18 | 19 | 20 | ... | 62 | 63 |
|---|---|---|---|---|---|---|---|---|---|---|---|---|
| 0 | 00 | Q1 | | Q15 | L0A | R0A | L2A | R2A | R4A | | L46A | R46A |
| 1 | | Q02 | | | L0B | L0B | | | | | | L46B |
| 2 | Q03 | | | | R48A | L48A | | | | | R94A | R94B |
| 3 | | Q04 | | | L48B | R48B | | | | | | |
| 4 | Q05 | | | | L96A | R96A | | | | | L142A | L142B |
| 5 | | Q06 | | | R96B | L96B | | | | | | |
| 6 | Q07 | | | | R144A | L144A | | | | | R190A | R190B |
| 7 | | Q08 | | | L144B | R144B | | | | | | |
| 8 | Q09 | | | | L192A | R192A | | | | | L238A | L238B |
| 9 | | Q010 | | | R192B | L192B | | | | | | |
| 10 | Q011 | | | | R240A | L240A | | | | | R286A | R286B |
| 11 | | Q012 | | | L240B | R240B | | | | | | |
| 12 | Q013 | | | | L288A | R288A | | | | | L334A | L334B |
| 13 | | Q014 | | | R288B | L288B | | | | | | |
| 14 | Q015 | | | | R336A | L336A | | | | | R382A | R382B |
| 15 | | Q016 | | | L336B | R336B | | | | | | |
| 16 | Q017 | | | | L384A | R384A | | | | | L430A | L430B |
| 17 | | Q018 | | | R384B | L384B | | | | | | |
| 18 | Q019 | | | | R432A | L432A | | | | | R478A | R478B |
| 19 | | Q020 | | | L432B | R432B | | | | | | |
| 20 | Q021 | | | | L480A | R480A | | | | | L526A | L526B |
| 21 | | Q022 | | | R480B | L480B | | | | | | |
| 22 | Q023 | | | | R528A | L528A | | | | | R574A | R574B |
| 23 | | Q024 | | | L528B | R528B | | | | | | |
| 24 | Q025 | | | | L576A | R576A | | | | | L622A | L622B |
| 25 | | Q026 | | | R576B | L576B | | | | | | |
| 26 | Q027 | | | | R624A | L624A | | | | | R670A | R670B |
| 27 | | Q028 | | | L624B | R624B | | | | | | |
| 28 | Q029 | | | | L672A | R672A | | | | | L718A | R718A |
| 29 | | Q030 | | | R672B | L672B | | | | | R718B | L718B |
| 30 | P00 | | | | P160 | P170 | | | | | P620 | P630 |
| 31 | | P01 | | | P171 | P161 | | | | | P631 | P621 |

← 16 BLOCKS → ← 48 BLOCKS →

Fig.2B

| | 64 | 65 | 66 | 67 | 68 | | 110 | 111 | 112 | 113 | 127 |
|---|---|---|---|---|---|---|---|---|---|---|---|
| 0 | R1A | L1A | R3A | L3A | R5A | | R47A | L47A | Q16 | Q17 | Q31 |
| 1 | L1B | R1B | L3B | | | | L95A | R47B | | | |
| 2 | L49A | R49A | R51B | R51A | | | | L95B | | | |
| 3 | R49B | L49B | | | | | R143A | | | | |
| 4 | R97A | L97A | L99B | L99A | | | | R143B | | | |
| 5 | L97B | R97B | | | | | L191A | | | | |
| | L145B | L145A | R147B | R147A | | | | L191B | | | |
| | R145B | R145A | | | | | R239A | | | | |
| | R193A | L193A | L195B | L195A | | | | R239B | | | |
| | L193B | R193B | | | | | L287A | | | | |
| 10 | L241A | R241A | R243B | R243A | | | | L287B | | | |
| | R241B | L241B | | | | | R335A | | | | |
| | R289A | L289A | L291B | L291A | | | | R335B | | | |
| | L289B | R289B | | | | | L383A | | | | |
| | L337A | R337A | R339B | R339A | | | | L383B | | | |
| 15 | R337B | L337B | | | | | R431A | | | | |
| 16 | R385A | L385A | L387B | L387A | | | | R431B | | | |
| | L385B | R385B | | | | | L479A | | | | |
| | L433A | R433A | R435B | R435A | | | | L479B | | | |
| | R433B | L433B | | | | | R527A | | | | |
| | R481A | L481A | L483B | L483A | | | | R527B | | | |
| 21 | L481B | R481B | | | | | L575A | | | | |
| | L529A | R529A | R531B | R531A | | | | L575B | | | |
| | R529B | L529B | | | | | R623A | | | | |
| | R577A | L577A | L579B | L579A | | | | R623B | | | |
| | L577B | R577B | | | | | L671A | | | | |
| | L625A | R625A | R627B | R627A | | | | L671B | | | |
| | R625B | L625B | | | | | R719A | | | | |
| 29 | R673A | L673A | L675B | L675A | | | | R719B | | | |
| 30 | L673B | R673B | P640 | P670 | | | P1100 | | | | |
| 31 | P651 | P641 | P671 | | | | P1101 | | | | P1271 |

←—48 BLOCKS—→ ←—16 BLOCKS—→

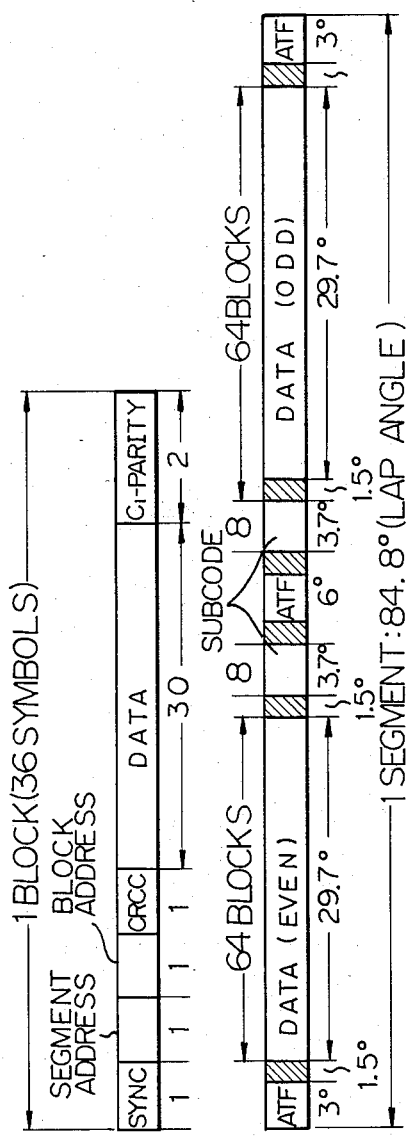
Fig.3A
Fig.3B
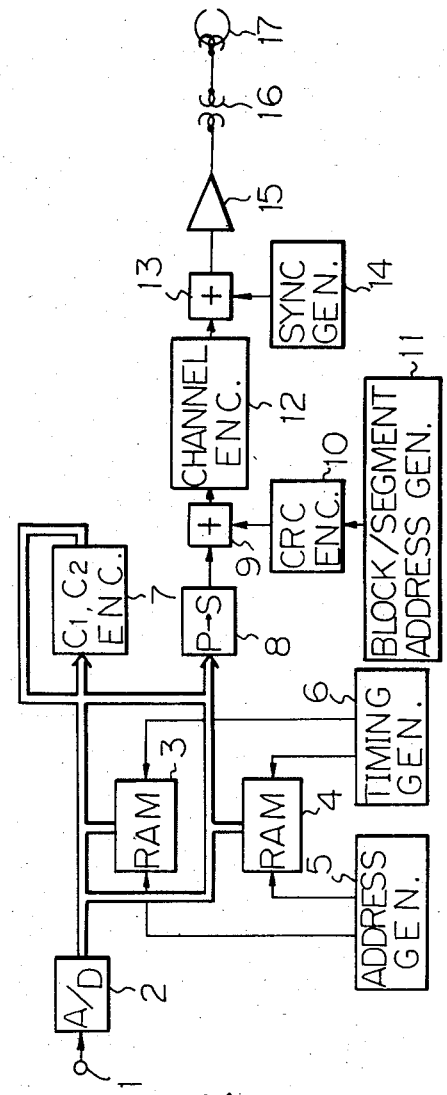
Fig. 4

Fig.5A

| | 0 | 1 | 16 | 17 | 18 | 19 | 20 | 21 | 62 | 63 |
|---|---|---|---|---|---|---|---|---|---|---|
| 0 | Q00 | Q010 | L0A | L48A | L2A | L50A | L4A | | L46A | L94A |
| 1 | Q011 | Q01 | R0A | R48A | R2A | R50A | R4A | | R46A | R94A |
| 2 | Q02 | Q012 | L0B | L48B | | | | | L46B | L94B |
| 3 | Q013 | Q03 | R0B | R48B | | | | | R46B | R94B |
| 4 | Q04 | Q014 | L96A | L144A | L98A | L146A | L100A | L148A | L142A | L190A |
| 5 | Q015 | Q05 | R96A | R144A | | | | | R142A | R190A |
| | Q06 | Q016 | L96B | L144B | | | | | L142B | L190B |
| | Q017 | Q07 | R96B | R144B | | | | | R142B | R190B |
| | Q08 | Q018 | L192A | L240A | L194A | L242A | L196A | L244A | L238A | L286A |
| | Q019 | Q09 | R192A | R240A | | | | | R238A | R286A |
| 10 | Q010 | Q110 | L192B | L240B | | | | | L238B | L286B |
| | Q111 | Q011 | R192B | R240B | | | | | R238B | R286B |
| | Q012 | Q112 | L288A | L336A | L290A | L338A | L292A | L340A | L334A | L382A |
| | Q113 | Q013 | R288A | R336A | | | | | R334A | R382A |
| | Q014 | Q114 | L288B | L336B | | | | | L334B | L382B |
| 15 | Q115 | Q015 | R288B | R336B | | | | | R334B | R382B |
| 16 | Q016 | Q116 | L384A | L432A | L386A | L434A | L388A | L436A | L430A | L478A |
| | Q117 | Q017 | R384A | R432A | | | | | R430A | R478A |
| | Q018 | Q118 | L384B | L432B | | | | | L430B | L478B |
| | Q119 | Q019 | R384B | R432B | | | | | R430B | R478B |
| | Q020 | Q120 | L480A | L528A | L482A | L530A | L484A | L532A | L526A | L574A |
| 21 | Q121 | Q021 | R480A | R528A | | | | | R526A | R574A |
| | Q022 | Q122 | L480B | L528B | | | | | L526B | L574B |
| | Q123 | Q023 | R480B | R528B | | | | | R526B | R574B |
| | Q024 | Q124 | L576A | L624A | L578A | L626A | L580A | L628A | L622A | L670A |
| | Q125 | Q025 | R576A | R624A | | | | | R622A | R670A |
| | Q026 | Q126 | L576B | L624B | R578B | R626B | R580B | R628B | L622B | L670B |
| | Q127 | Q027 | R576B | R624B | R674A | L674A | R676A | | R622B | R670B |
| 29 | Q028 | P10 | L672A | P170 | L674A | | L676A | | L718A | P630 |
| 30 | P00 | Q029 | R672A | P160 | L674B | | L676B | | R718A | P620 |
| 31 | Q129 | P01 | L672B | P171 | R674B | | R676B | | L718B | P631 |
| | | | R672B | P161 | | | | | R718B | P621 |

← 16 BLOCKS → ← 48 BLOCKS →

Fig. 5B

|   | 64 | 65 | 66 | 67 | 68 | 69 | 110 | 111 | 112 | 113 |
|---|---|---|---|---|---|---|---|---|---|---|
| 0 | R1A | R49A | R3A | R51A | R5A | R53A | R47A | R95A | Q1120 | Q1130 |
| 1 | L1A | L49A | L3A | L51A | L5A | L53A | L47A | L95A | Q1131 | Q1121 |
| 2 | R1B | R49B | | | | | R47B | R95B | | |
| 3 | L1B | L49B | | | | | L47B | L95B | | |
| 4 | R97A | R145A | R99A | R147A | R101A | R149A | R143A | R191A | | |
| 5 | L97A | L145A | | | | | L143A | L191A | | |
| --- | | | | | | | | | | |
| | R97B | R145B | | | | | R143B | R191B | | |
| | L97B | L145B | | | | | L143B | L191B | | |
| | R193A | R241A | R195A | R243A | R197A | R245A | R239A | R287A | | |
| 10 | L193A | L241A | | | | | L239A | L287A | | |
| --- | | | | | | | | | | |
| | R193B | R241B | | | | | R239B | R287B | | |
| | L193B | L241B | | | | | L239B | L287B | | |
| | R289A | R337A | R291A | R339A | R293A | R341A | R335A | R383A | | |
| | L289A | L337A | | | | | L335A | L383A | | |
| 15 | R289B | R337B | | | | | R335B | R383B | | |
| 16 | L289B | L337B | | | | | L335B | L383B | | |
| | R385A | R433A | R387A | R435A | R389A | R437A | R431A | R479A | | |
| | L385A | L433A | | | | | L431A | L479A | | |
| | R385B | R433B | | | | | R431B | R479B | | |
| | L385B | L433B | | | | | L431B | L479B | | |
| 21 | R481A | R529A | R483A | R531A | R485A | R533A | R527A | R575A | | |
| | L481A | L529A | | | | | L527A | L575A | | |
| | R481B | R529B | | | | | R527B | R575B | | |
| | L481B | L529B | | | | | L527B | L575B | | |
| | R577A | R625A | R579A | R627A | R581A | R629A | R623A | R671A | | |
| | L577A | L625A | | | | | L623A | L671A | | |
| | R577B | R625B | | | | | R623B | R671B | | |
| 29 | L577B | L625B | L579B | L627B | L581B | L629B | R719A | P1110 | | |
| 30 | L673A | P650 | R675A | R677A | R677A | | L719A | P1100 | | |
| 31 | R673B | P651 | R675B | R677B | R677B | | R719B | P1111 | | |
|   | L673B | P641 | L675B | L677B | L677B | | L719B | P1101 | | |

← 48 BLOCKS → ← 16 BLOCKS →

| | 0 | 1 | 2 | 3 | 4 | 5 | | 46 | 47 |
|---|---|---|---|---|---|---|---|---|---|
| 1 | L0A | L292A | L6A | L298A | L12A | L304A | | L138A | L430A |
| 2 | R0A | R292A | | | | | | | |
| 3 | L0B | L292B | L6B | L298B | L12B | L304B | | L138B | L430B |
| 4 | R0B | R292B | | | | | | | |
| 5 | L2A | L432A | L8A | L438A | L14A | L444A | | L140A | L570A |
| 6 | R2A | R432A | | | | | | | |
| 7 | L2B | L432B | L8B | L438B | L14B | L444B | | L140B | L570B |
| 8 | R2B | R432B | | | | | | | |
| 9 | L4A | L434A | L10A | L440A | L16A | L446A | | L142A | L572A |
| 10 | R4A | R434A | | | | | | | |
| 11 | L4B | L434B | L10B | L440B | L16B | L446B | | L142B | L572B |
| 12 | R4B | R434B | | | | | | | |
| 13 | L144A | L436A | L150A | L442A | L156A | L448A | | L282A | L574A |
| 14 | R144A | R436A | | | | | | | |
| 15 | L144B | L436B | L150B | L442B | L156B | L448B | | L282B | L574B |
| 16 | R144B | R436B | | | | | | | |
| 17 | L146A | L576A | L152A | L582A | L158A | L588A | | L284A | L714A |
| 18 | R146A | R576A | | | | | | | |
| 19 | L146B | L576B | L152B | L582B | L158B | L588B | | L284B | L714B |
| 20 | R146B | R576B | | | | | | | |
| 21 | L148A | L578A | L154A | L584A | L160A | L590A | | L286A | L716A |
| 22 | R148A | R578A | | | | | | | |
| 23 | L148B | L578B | L154B | L584B | L160B | L590B | | L286B | L716B |
| 24 | R148B | R578B | | | | | | | |
| 25 | L288A | L580A | L274A | L586A | L300A | L592A | | L426A | L718A |
| 26 | R288A | R580A | | | | | | | |
| 27 | L288B | L580B | L274B | L586B | L300B | L592B | | L426B | L718B |
| 28 | R288B | R580B | | | | | | | |
| 29 | L290A | P10 | L276A | | L302A | | | L428A | |
| 30 | R290A | P20 | | P | | P | | | P |
| 31 | L290B | P11 | L276B | | L302B | | | L428B | |
| 32 | R290B | P21 | | | | | | | |

48 BLOCKS

Fig. 7B

| | | 32 BLOCKS | | 48 BLOCKS | | | | | |
|---|---|---|---|---|---|---|---|---|---|
| | 48 | 49 | | 80 | 81 | 82 | 83 | 126 | 127 |
| | Q490 | Q4916 | | R1A / L1A | R293A / L293A | R7A | R299A | R139A | R431A |
| | Q491 | Q4917 | | R1B / L1B | R293B / L293B | R7B | R299B | R139B | R431B |
| | Q492 | Q4918 | | R3A / L3A | R433A / L433A | R9A | R439A | R141A | R571A |
| | Q493 | Q4919 | | R3B / L3B | R433B / L433B | R9B | R439B | R141B | R571B |
| | Q494 | Q4920 | | R5A / L5A | R435A / L435A | R11A | R441A | R143A | R573A |
| | Q495 | Q4921 | | R5B / L5B | R435B / L435B | R11B | R441B | R143B | R573B |
| | Q496 | Q4922 | | R145A / L145A | R437A / L437A | R151A | R443A | R283A | R575A |
| | Q497 | Q4923 | Q | R145B / L145B | R437B / L437B | R151B | R443B | R283B | R575B |
| | Q498 | Q4924 | | R147A / L147A | R577A / L577A | R153A | R583A | R285A | R715A |
| | Q499 | Q4925 | | R147B / L147B | R577B / L577B | R153B | R583B | R285B | R715B |
| | Q4910 | Q4926 | | R149A / L149A | R579A / L579A | R155A | R585A | R287A | R717A |
| | Q4911 | Q4927 | | R149B / L149B | R579B / L579B | R155B | R585B | R287B | R717B |
| | Q4912 | Q4928 | | R289A / L289A | R581A / L581A | R295A | R587A | R427A | R719A |
| | Q4913 | Q4929 | | R289B / L289B | R581B / L581B | R295B | R587B | R427B | R719B |
| | Q4914 | P | | R291A / L291A | P | R297A | P | R429A | P |
| | Q4915 | | | R291B / L291B | | R297B | | R429B | |

ENCODING METHOD FOR ERROR CORRECTION

BACKGROUND OF THE INVENTION

1. Field of the Invention

The present invention relates to an encoding method for error correction which is applied to record, for example, an audio PCM signal on a magnetic tape by a rotary head.

2. Description of the Prior Art

There is known a method for performing the error detection or encoding error correction codes in the longitudinal and lateral directions of digital information data arranged like a matrix, respectively. As one method in case of transmitting these codes for every column and decoding them on the reception side, there is considered a method whereby the error detection is performed by a first error detection code for each column, a pointer as a result of this is produced, and the data and pointer of each column are stored in a memory, then the error correction is performed for every row by a second error correction code with reference to this pointer.

Upon this decoding, a block address is added in order to write the data in each column (hereinbelow, referred to as a block) in the memory in accordance with the correct time sequence. However, in the case in which the error detection is performed for every block, there is a problem that if a block address is wrong, it is impossible to detect that the data is written in a wrong address of the memory, so that when the erasure correction using the pointer is performed by the second error correction code, the wrong error correction will have been done.

OBJECTS AND SUMMARY OF THE INVENTION

The present invention intends to enable the error detection to be certainly performed in the case where a data was written in a wrong block address upon decoding since a code sequence of a first error detection code exists in a plurality of (for example, two) blocks. Therefore, according to the present invention, the error correction by a second error correction code, can perform the erasure correction using a pointer thereby fully utilizing the error correction capability.

In this invention, a code sequence of an error detectable first error detection code, which is applied to encode in one direction of the digital information data in which a plurality of blocks each consisting of a plurality of symbols are arranged, is allowed to exist in some blocks among the plurality of blocks; a code sequence of a second error correction code is formed in another direction by a plurality of symbols which are respectively included in the different code sequences of the first error detection code; and the blocks which consist of the symbols of the digital information data and the redundancy data of the first error detection code and the blocks which consist of the redundancy data of the second error correction code and the redundancy data of the first error detection code are sequentially transmitted.

BRIEF DESCRIPTION OF THE DRAWINGS

FIGS. 2A and 2B are schematic diagrams showing a code constitution in one embodiment in the case where the present invention was applied to record two-channel audio PCM signals by a rotary head;

FIGS. 3A and 3B are schematic diagrams showing data formats of a record data of one embodiment of the present invention;

FIG. 4 is a block diagram of one embodiment of the present invention;

FIGS. 5A and 5B are schematic diagrams which are used to describe another example of a code constitution to which the invention was applied;

FIGS. 6A and 6B are schematic diagrams which are used to describe still another example of a code constitution to which the invention was applied; and FIGS. 7A and 7B are schematic diagrams which are used to describe further another example of a code constitution to which the invention was applied.

DESCRIPTION OF THE PREFERRED EMBODIMENTS

Figure 1:
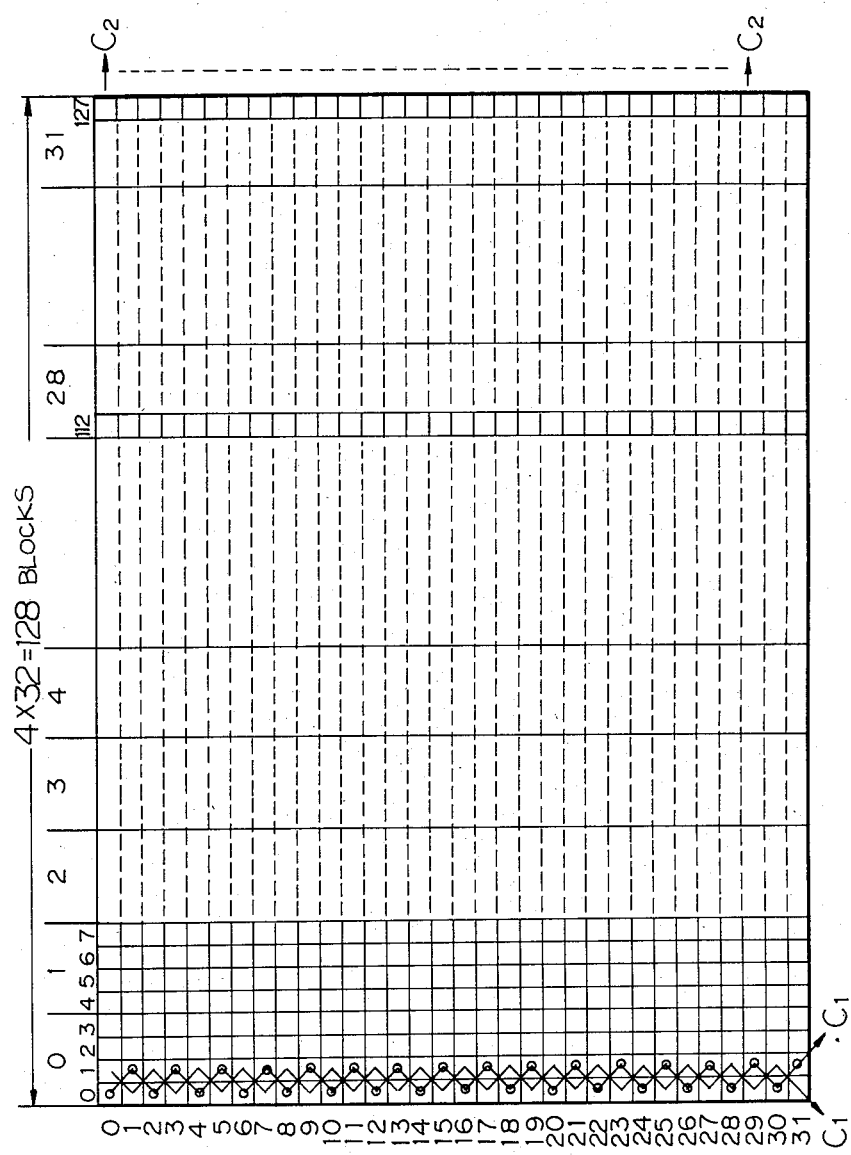
FIG. 1 is a schematic diagram which is used to describe a code constitution of the present invention.

One embodiment of the present invention intends to record an audio PCM signal on a magnetic tape by a rotary head. FIG. 1 shows a code constitution of the audio PCM signal and redundancy data of error correction codes which are recorded in one segment to be formed by scanning of one time by the rotary head.

In FIG. 1, one block consists of each row in the vertical direction and 128 blocks to which block addresses of 0 to 127 are numbered are arranged in the horizontal direction. A first error correction code $C_1$ is added to the vertical direction of such a two-dimensional array, while a second error correction code $C_2$ is added to its horizontal direction. The error correction code $C_1$ is the Reed Solomon codes over GF ($2^8$) of (32, 30) and its code sequence has an interleave constitution of two-block completion.

As an example, as shown in FIG. 1, with respect to two adjacent blocks, one code sequence is formed by 16 symbols of even addresses in the block in the block address "0" and 16 symbols of odd addresses in the block in the block address "1". On the other hand, another code sequence is formed by 16 symbols having odd addresses in the block in the block address "0" and 16 symbols having even addresses in the block in the block address "1". Parity symbols of the error correction code $C_1$ are arranged in the addresses 30 and 31 in the block. This two-block completion interleave is performed with regard to all of the 128 blocks. An example of H matrix of the error correction code $C_1$ is shown below.

$$H = \begin{bmatrix} 1 & 1 & 1 & \ldots 1 & 1 & 1 & 1 \\ \alpha^{31} & \alpha^{30} & \alpha^{29} & \ldots \alpha^3 & \alpha^2 & \alpha & 1 \end{bmatrix}$$

in which, $\alpha$ is any element over GF ($2^8$).

Assuming that the matrix of the reproduction data sequence of 32 symbols including two parity symbols is $V$ and that its transposed matrix is $V^T$, the decoding of the error correction code $C_1$ is performed by forming two syndromes by the arithmetic operation of $H \cdot V^T$. When both of these syndromes are 0, it means that no error is detected, and in the other cases, it means that errors are detected. The error correction code $C_1$ is the code in which a single error can be corrected and two or more errors can be detected.

In addition, 128 blocks are divided into 32 sections each consisting of four blocks and the code sequence of the second error correction code $C_2$ is formed by 32 symbols fetched from each four blocks. This error correction code $C_2$ is the Reed Solomon codes over GF $(2^8)$ of (32, 24) and 8 parity symbols are formed with regard to total 24 symbols of the blocks at every four blocks (e.g., the block addresses of "0", "4", "8", ..., "88", and "92") among the 96 blocks having the block addresses "0" to "95". These parity symbols are arranged to the addresses at every four blocks (e.g., the block addresses of "96", "100", "104", ..., "120", and "124").

That is, the interleave of four blocks is performed regarding the error correction code $C_2$ and the parity symbols of the error correction code $C_2$ locate in 32 blocks having the block addresses "96" to "127". However, the parity symbols of the error correction code $C_1$ regarding these parity symbols are arranged in the addresses 30 and 31 in the block.

The error correction code $C_2$ is the code in which a four-tuple error can be corrected and when the erasure correction is performed using a pointer, an eight-tuple error can be corrected. An example of the H matrix of the error correction code $C_2$ is shown below.

$$H = \begin{bmatrix} 1 & 1 & 1 & \ldots 1 & 1 & 1 & 1 \\ \alpha^{29} & \alpha^{28} & \alpha^{27} & \ldots \alpha^3 & \alpha^2 & \alpha & 1 \\ . & . & . & \ldots \alpha^6 & \alpha^4 & \alpha^2 & 1 \\ . & . & . & \ldots \alpha^9 & \alpha^6 & \alpha^3 & 1 \\ . & . & . & \ldots \alpha^{12} & \alpha^8 & \alpha^4 & 1 \\ . & . & . & \ldots \alpha^{15} & \alpha^{10} & \alpha^5 & 1 \\ . & . & . & \ldots \alpha^{18} & \alpha^{12} & \alpha^6 & 1 \\ . & . & . & \ldots \alpha^{21} & \alpha^{14} & \alpha^7 & 1 \end{bmatrix}$$

In this way, both error correction codes $C_1$ and $C_2$ have the same code length of 32 symbols, so that this enables a hardware to be simplified. In addition, when decoding, the error detection is simply performed using the error correction code $C_1$; on the other hand, when errors are detected, a pointer is set into its code sequence and the error correction is then performed using the error correction code $C_2$. This error correction is carried out with respect to each of the addresses 0 to 29 in the block, so that the decoding operations are done 30 times. Furthermore, in case of recording on a magnetic tape, each block is sequentially recorded as a serial data.

FIGS. 2A and 2B show a more practical code constitution of one embodiment of the present invention. FIG. 2A shows the section of the blocks having the block addresses "0" to "63" among 128 blocks, while FIG. 2B shows the section of the blocks having the block addresses "64" to "127". In this FIG. 2, L and R represent an audio PCM signal in each channel of the two-channel audio signals. For example, a sampling frequency $f_s$ of 48 kHz is used and one sample is converted into 16 bits. At this time, the data of total 1440 words are recorded in one segment with regard to both channels of ($L_0-L_{719}$) and ($R_0-R_{719}$).

The encoding of the error correction is performed using eight bits as one symbol; therefore, one word is divided into the higher significant eight bits and the lower significant eight bits and these are represented by suffixes A and B. Therefore, the audio PCM data of 2880 symbols are included in one segment and these symbols are arranged in 96 blocks each consisting of 30 symbols. In addition, they are sequentially recorded one block by one in accordance with the block addresses "0", "1", "2", .... Generally, in tape recorders of the rotary head type, the contact conditions between the rotary head and the magnetic tape at the edge portion where the slide contact therebetween is started and at the edge portion where the slide contact is ended are bad; thus, this causes an error rate to be raised. Therefore, parity symbols Q of the error correction code $C_2$ and parity symbols P of the error correction code $C_1$ regarding this are arranged respectively in the blocks having the block addresses "0"–"15" and in the blocks of the block addresses "112"–"127" which correspond to these edge portions. The audio PCM data and the parity symbols P regarding this are arranged in the blocks of the block addresses "16"–"111" corresponding to the central section.

On the other hand, with respect to a word which cannot be corrected due to errors at the time of record and reproduction, it is interpolated by the correct words which locate before and after such a word on the time sequence. To effectively perform this interpolation, it is desirable to keep a certain distance between the recording positions of the PCM data bearing even numbers and bearing odd numbers in each channel. For this purpose, the data bearing even numbers among the audio PCM data are arranged in the block addresses "16"–"63" (FIG. 2A) and the data bearing odd numbers among the audio PCM data are arranged in the block addresses "64"–"111" (FIG. 2B).

As an example, one code sequence of the error correction code $C_1$ included in the block addresses "16" and "17" shown in FIG. 2A is as shown below.

($L_{0A}$, $L_{0B}$, $R_{48A}$, $R_{48B}$, $L_{96A}$, $L_{96B}$, $R_{144A}$, $R_{144B}$, $L_{192A}$, $L_{192B}$, $R_{240A}$, $R_{240B}$, $L_{288A}$, $L_{288B}$, $R_{336A}$, $R_{336B}$, $L_{384A}$, $L_{384B}$, $R_{432A}$, $R_{432B}$, $L_{480A}$, $L_{480B}$, $R_{528A}$, $R_{528B}$, $L_{576A}$, $L_{576B}$, $R_{624A}$, $R_{624B}$, $L_{672A}$, $L_{672B}$, $P_{160}$, $P_{161}$).

It will be understood from this example that in the code constitution shown in FIG. 2, as a first point, two symbols which constitute the same word are included in the same code sequence of the error correction code $C_1$. This is because the interpolation is performed using 15 words in the case where this code sequence is detected as an error and also it cannot be corrected by the error correction code $C_2$.

As a second point, the interleave of 15 words included in the same code sequence of the error correction code $C_1$ is done so as not to include the adjacent words. As described above, the interleave is performed so that the words which are apart by every 48 words from each other in each channel are included, thereby allowing the interpolation ability to be improved. This is also done with regard to the error correction code $C_2$. For example, as shown in FIGS. 2A and 2B, the sequence of the error correction code $C_2$ taken at address 0 of the block comprises the following 32 words:

$L_{0A}$, $L_{4A}$, $L_{8A}$, $L_{12A}$, $L_{16A}$, $L_{20A}$, $L_{24A}$, $L_{28A}$, $L_{32A}$, $L_{36A}$, $L_{40A}$, $L_{44A}$, $R_{1A}$, $R_{5A}$, $R_{9A}$, $R_{13A}$, $R_{17A}$, $R_{21A}$, $R_{25A}$, $R_{29A}$, $R_{33A}$, $R_{37A}$, $R_{41A}$, $R_{45A}$, $Q_0$, $Q_4$, $Q_8$, $Q_{12}$, $Q_{16}$, $Q_{20}$, $Q_{24}$, $Q_{28}$).

Furthermore, the data in two channels are included in the code sequences of the error correction codes $C_1$ and $C_2$, respectively, so that the number of them are as equal as possible. This aids in preventing a greater concentration of errors in the channel on one side.

Each block has a data format shown in FIG. 3A. Namely, a block sync signal of eight bits (one symbol) is added to the head, and a segment address of eight bits and a block address of eight bits are added, then a CRC code (eight bits) for error detection of the segment address and block address is added. An MSB of the block address is used to distinguish the block address of the data from the block address of the subcode. Furthermore, the data of 30 symbols (audio data or parity symbols Q of the error correction code $C_2$) are arranged after this CRC code. Two parity symbols P of the error correction code $C_1$ are arranged in the last portion.

On the other hand, the data of one segment which is produced by the rotary head has a data format shown in FIG. 3B. In this embodiment, one segment is formed by the rotary head in the oblique direction of the magnetic tape which was wrapped at 84.8° around a tape guide drum having a diameter of 30 mm. Pilot signals ATF for automatically following the track are recorded in each interval pf 3° in both end portions and central portion of this segment. The reason why the pilot signals are recorded in three portions is to insure that the pilot signals will be reproduced and not lost. A tracking error is detected due to the reproduction output of these pilot signals ATF and a piezo-electric element which supports the rotary head is driven on the basis of this detection, thereby removing the tracking error.

In addition, the data of the block addresses "0" to "63" shown in FIG. 2A are sequentially recorded in a range of 29.7°. Furthermore, the subcodes of four blocks such as time codes, display data, and the like are written twice before and after the pilot signal ATF in the central portion. The data of the block addresses "64" to "127" shown in FIG. 2B are sequentially recorded in a range of 29.7°. Also, in FIG. 3B, the intervals of each 1.5° in the hatched portions denote the interblock gaps where no data is recorded and pulse signals of a constant frequency are recorded in these intervals.

FIG. 4 shows a constitution of a recording circuit of one embodiment of the present invention, in which an analgo audio signal is supplied to an input terminal indicated at a reference numeral 1. This analog audio signal is digitized by an A/D converter 2. In case of the two-channel audio signals, two A/D converters are needed. The audio PCM signal from the A/D converter 2 is input as the data inputs to RAMs 3 and 4. Each of the RAMs 3 and 4 has the memory capacity to store the data of the unit (2880 symbols in the foregoing example) of which the error correction code is encoded.

An address generator 5 and a timing generator 6 are provided with respect to the RAMs 3 and 4, so that the RAM 3 and RAM 4 are controlled in the manner such that they write and read the data on a byte unit basis. The reason why two RAMs 3 and 4 are provided is to write the input audio PCM signal in one RAM and to read out the audio PCM signal from the other RAM, thereby encoding the error correction codes.

The predetermined audio PCM signal which was read out from the RAM 3 or RAM 4 is supplied to an encoder 7 of the error correction codes $C_1$ and $C_2$ and the respective parity symbols are formed. These parity symbols are written in either one of the RAMs 3 and 4. After completion of the formation of the parity symbols, the data which includes these parity symbols is read out from the RAM 3 or 4 for every block and is supplied to a parallel-to-serial converter 8 and is converted into th serial data.

An output data of the parallel-to-serial converter 8 is supplied to an adder 9. The block address and segment address which are formed by a block address and segment address generator 11 and to which the CRC codes were added by being transmitted through a CRC encoder 10 are supplied to the adder 9. An output of this adder 9 is supplied to a channel encorder 12 and is subjected to the channel encoding processing. Furthermore, an output of the channel encoder 12 and the block sync signal from a synchronous generator 14 are added to an adder 13. An output of the adder 13 is supplied to a rotary head 17 through a recording amplifier 15 and a rotary transformer 16. In this way, the audio signal is recorded on the magnetic tape by this rotary head 17.

Although not shown, the processing of the signal reproduced from the magnetic tape by the rotary head 17 is performed by storing the reproduction data into the RAM. That is, the reproduction data in one segment is written in the RAM on the basis of the block addresses reproduced; the error correction code $C_1$ is decoded using 32 symbols which were read out from this RAM and which exist in two adjacent blocks; the pointer obtained by this decoding is stored in the memory; then the error correction code $C_2$ is decoded using 32 symbols which were read out from the RAM. The above-mentioned pointer is used to check whether the error location obtained is correct or not when the error correction code $C_2$ is decoded and to perform the erasure correction. Furthermore, in this embodiment, since the detection is made individually to see if the reproduced block address is correct or not, in the case where the reproduced block address is not correct, the data in this block is not written in the RAM but is thrown away.

FIGS. 5A and 5B show another example of a code constitution of the data to be recorded on a record medium in one segment. In a manner similar to that described before, the code constitution as shown in FIGS. 5A and 5B is adopted in consideration of the following three points: the first point is that two symbols constituting the same word are included in each code sequence of the error correction code $C_1$; the second point is that each code sequence of the error correction codes $C_1$ and $C_2$, which includes the audio PCM signal, does not include the adjacent words of this signal; and the third point is that the audio PCM signal included in each code sequence of the error correction codes $C_1$ and $C_2$ includes the words in two channels so that the numbers thereof are as equal as possible. Moreover, in this code constitution, unlike the code constitution of FIG. 2, the audio PCM signal which is arranged in two adjacent blocks is distributed so that the two symbols comprising one word are not consecutive in the first error correction code sequence. In addition, the parity symbols of the error correction code $C_1$ are collected in either one of the two adjacent blocks; furthermore, two symbols which are included in the same word of the audio PCM signal are included in the same block. With such a constitution, it is possible to reduce the number of words which will become errors due to the burst error which exists in two blocks.

Figure 6A:
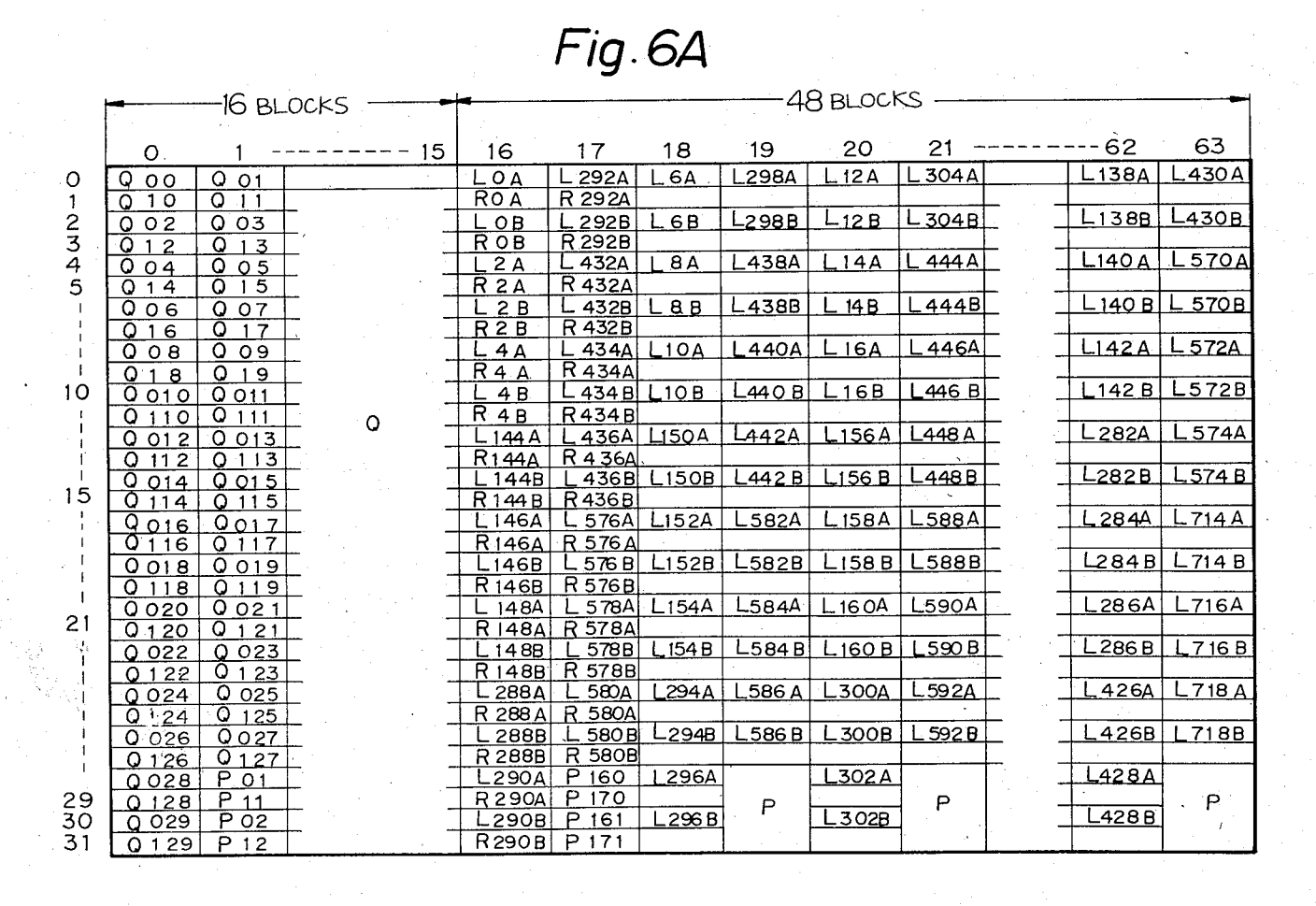
Figure 6B:
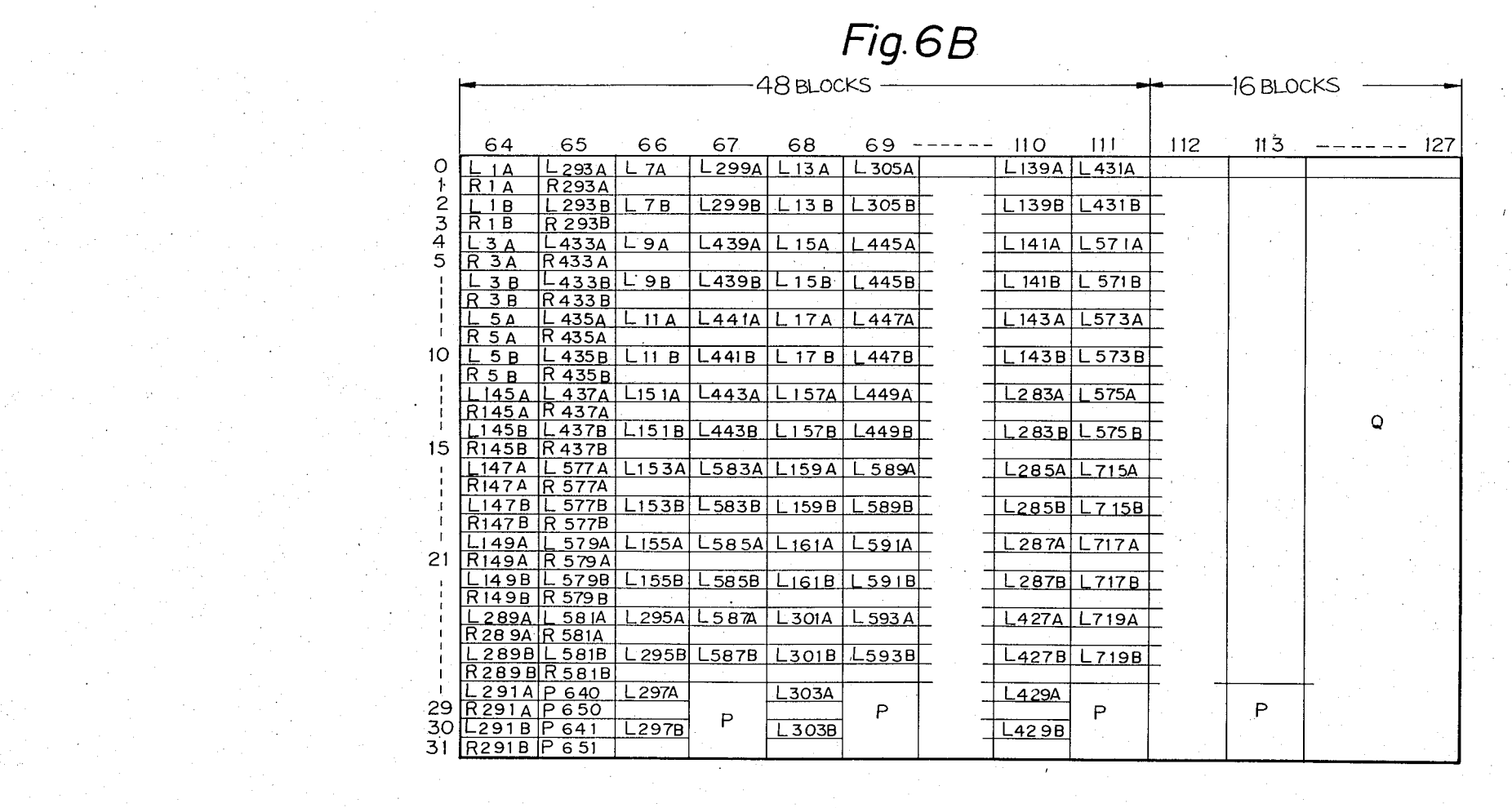

FIGS. 6A and 6B show still another example of a code constitution of the data which is recorded in one segment. In this example of FIG. 6, in order to part the recording location of the even number designated PCM data in each channel from the recording location of the odd number designated PCM data, the even number designated data are arranged in 48 blocks having the block addresses "16"–"63" and the odd number designated data are arranged in 48 blocks of the block addresses "64"–"111". The PCM data is distributed in each block of the block addresses "16"–"63" using three adjacent words in this even number designated data sequence as a unit, while the PCM data is distributed in each block of the block addresses "64"–"111" using three adjacent words in this odd number designated data sequence as a unit. In such an arrangement, three words in each block are adjacent to each other and the groups each consisting of three words can be apart from each other.

Generally, in tape recorders of the rotary head type, the contact conditions between the rotary head and the magnetic tape at the edge portion where the slide contact therebetween is started and at the edge portion where the slide contact is ended are bad, so that this causes an error rate to be raised. Therefore, the check code symbols Q of the error correction code $C_2$ and the check code symbols P of the error correction code $C_1$ regarding this are arranged respectively in the blocks having the block addresses "0"–"15" (FIG. 6A) and in the blocks of the block addresses "112"–"127" (FIG. 6B) which correspond to these edge portions. The audio PCM data and the check code symbols P regarding this are arranged in the blocks of the block addresses "16"–"111" corresponding to the central section.

The error detection code $C_1$ is the Reed Solomon codes over GF ($2^8$) of (32, 30) and the code sequence has the interleave constitution of the two-block completion to certainly detect the errors of the block addresses. For example, the error detection code $C_1$ is encoded with respect to 30 symbols ($Q_{00}$, $Q_{02}$, $Q_{04}$, $Q_{06}$, ..., $Q_{028}$, $Q_{01}$, $Q_{03}$, ..., $Q_{025}$, $Q_{027}$, $Q_{029}$) which locate in the respective even number designated addresses in the blocks of the block addresses "0" and "1", and the check code symbols of $P_{01}$ and $P_{02}$ are added. With regard to the block addresses "16" and "17" also, one code sequence of the error detection code $C_1$ is formed similarly by 32 symbols ($L_{0A}$, $L_{0B}$, $L_{2A}$, $L_{2B}$, ..., $L_{290A}$, $L_{290B}$, $L_{292A}$, $L_{292B}$, ..., $L_{580A}$, $L_{580B}$, $P_{160}$, $P_{161}$) which locate in the respective even number designated addresses in the blocks. In addition, one code sequence of the error detection code $C_1$ is formed by 32 symbols ($R_{0A}$, $R_{0B}$, ..., $R_{290A}$, $R_{290B}$, ..., $R_{580A}$, $R_{580B}$, $P_{170}$, $P_{171}$) which locate in the odd number designated addresses in the blocks of the block addresses "16" and "17".

It will be appreciated from this example that in the code constitution shown in FIG. 6, two symbols which constitute the same word are included in the same code sequence of the error detection code $C_1$. This is because the error word is simply interpolated by 15 words in the case where this code sequence is detected as an error and also it cannot be corrected by the error correction code $C_2$.

In addition, the data in one of the two channels is concentrated in the code sequence of the error detection code $C_1$. However, since the symbols of the mutually corresponding symbol numbers in two channels are alternately recorded, there will hardly occur the case such that the errors concentrically occur in only one channel when recording.

An example of the H matrix of the error detection code $C_1$ is shown below.

$$H = \begin{bmatrix} 1 & 1 & 1 & \ldots 1 & 1 & 1 & 1 \\ \alpha^{31} & \alpha^{30} & \alpha^{29} & \ldots \alpha^3 & \alpha^2 & \alpha & 1 \end{bmatrix}$$

Assuming that the matrix of the reproduction data sequence of 32 symbols which include two parity symbols is V and that its transposed matrix is $V^T$, the decoding of the error detection code $C_1$ is performed by forming two syndromes by the arithmetic operation of $H \cdot V^T$. When both of these syndromes are 0, it means that no error is detected, and in the other cases, it means that errors are detected. The error correction code $C_1$ is inherently the code in which a single error can be corrected and double or more-tuple errors can be detected.

In addition, 128 blocks are divided into 32 sections each consisting of four blocks and the code sequence of the error correction code $C_2$ is formed by 32 symbols fetched from each four blocks. This error correction code $C_2$ is the Reed Solomon codes over GF ($2^8$) of (32, 24) and 8 check code symbols are formed with regard to total 24 symbols of the blocks at every four blocks (for example, the block addresses of "16", "20", "24", ..., "104", "108") among the 96 blocks having the block addresses "16" to "111". These check code symbols are arranged to the addresses at every four blocks (e.g., the block addresses of "0", "4", "8", "12", "112", "116", "120", "124").

That is, the interleave of four blocks is performed regarding the error correction code $C_2$ and the check code symbols of the error correction code $C_2$ locate in 32 blocks having block addresses of "0" to "15" and "112" to "127". However, the check code symbols of the error detection code $C_1$ regarding these check code symbols are arranged in the addresses 30 and 31 in the block.

The error correction code $C_2$ is the code in which a four-tuple error can be corrected and when the erasure correction is performed using a pointer, an eight-tuple error can be corrected. An example of the H matrix of the error correction code $C_2$ is shown below.

$$H = \begin{bmatrix} 1 & 1 & 1 & \ldots 1 & 1 & 1 & 1 \\ \alpha^{29} & \alpha^{28} & \alpha^{27} & \ldots \alpha^3 & \alpha^2 & \alpha & 1 \\ \cdot & \cdot & \cdot & \ldots \alpha^6 & \alpha^4 & \alpha^2 & 1 \\ \cdot & \cdot & \cdot & \ldots \alpha^9 & \alpha^6 & \alpha^3 & 1 \\ \cdot & \cdot & \cdot & \ldots \alpha^{12} & \alpha^8 & \alpha^4 & 1 \\ \cdot & \cdot & \cdot & \ldots \alpha^{15} & \alpha^{10} & \alpha^5 & 1 \\ \cdot & \cdot & \cdot & \ldots \alpha^{18} & \alpha^{12} & \alpha^6 & 1 \\ \cdot & \cdot & \cdot & \ldots \alpha^{21} & \alpha^{14} & \alpha^7 & 1 \end{bmatrix}$$

In this way, both codes $C_1$ and $C_2$ have the same code length of 32 symbols, so that this enables a hardware to be simplified. In addition, when decoding, the error detection is simply performed using the error correction code $C_1$; on the other hand, when errors are detected, a pointer is set into its code sequence and the error correction is then performed using the error correction code $C_2$. This error correction is carried out with respect to each of the addresses 0 to 29 in the block, so that the decoding operations are done 30 times.

FIGS. 7A and 7B show further another example of a code constitution of the data to be recorded in one segment. In this example shown in FIG. 7, the audio PCM data and the parity symbols regarding this are arranged in 48 blocks of the block addresses "0" to "47"

among 128 blocks as shown in FIG. 7A, and the parity symbols Q of the error correction code $C_2$ and the parity symbols P of the error correction code $C_1$ regarding this are arranged in 32 blocks of the block addresses "48" to "79" as shown in Fig. 7B, and the audio PCM data and the parity symbols regarding this are arranged in 48 blocks of the block addresses "80" to "127". The symbols bearing even numbers and the symbols bearing odd numbers are collectively arranged respectively in these two sections of 48 blocks and are interleaved in accordance with the order as indicated by the suffixes.

The similar error correction encoding as the foregoing embodiment is performed with respect to the symbols which were arranged as shown in Fig. 7. That is, the $C_2$ code sequence is set whereby the symbols at every four symbols among the symbols which are arranged in the horizontal direction are fetched. Four parity symbols Q are generated with regard to these 12 symbols and are provided continuously to the code sequences at every four sequences, respectively. Due to this, the matrix having 64 (data 48+parities 16) blocks on one side, i.e., having 128 blocks on the whole is formed.

Furthermore, for example, the code sequence of which only the audio data in the left channel or only the audio data in the right channel is sequentially fetched with respect to two blocks in the leftmost positions is set. Then, each two parity symbols $P_{10}$, $P_{11}$, $P_{20}$, and $P_{21}$ are generated respectively with regard to these respective 30 symbols. These symbols are inserted into the positions shown, respectively. Every four parity symbols of these parity symbols in addition to the portions of the parity symbols Q are sequentially provided to two blocks.

In this way, the error detection processing by the parity of 1216 symbols is performed with respect to the data of 2880 symbols, then the transmission is executed using 4096 symbols as one frame on the whole.

In the present invention, error detection codes, for instance, CRC codes may be used as the error correction code $C_1$ instead of using the codes over GF $(2^b)$ such as the Reed Solomon codes or the like.

In addition, not only the error detection but also the error correction may be performed by the error correction code $C_1$. This error correction code $C_1$ may be interleaved so as to exist in a plurality of blocks such as two blocks. This interleave reduces the number of cases where the error correction becomes impossible.

Furthermore, the present invention can be also applied to the case where any other digital information such as a digital video signal and the like as well as the digital audio signal is transmitted. It is obvious that the invention can be also applied to the case where a magnetic disk recording apparatus and the like other than the rotary head type recording apparatus are used.

According to the present invention, since the interleave of a plurality of blocks is performed with regard to the first error detection code, it is possible to certainly detect that the data of the block is written in the block address having wrong memory, and it is possible to prevent the interleave error such that the decoding of the second error correction code becomes wrong. In addition, the pointer by the first error detection code does not differ for every code sequence of the second error correction code and has only a plurality of patterns (the number of blocks in which the first error detection code exists); therefore, it is possible to easily perform the erasure correction using a pointer.

What is claimed is:

1. An encoding method for error correction of digital information data, said encoding method comprising the steps of:
   arranging said digital information data in a plurality of blocks each including a plurality of symbols;
   generating first redundancy data from first respective groups of digital information data constituting symbols which exist in two adjacent only blocks of said plurality of blocks in a first direction in said blocks of digital information data;
   generating second redundancy data from second respective groups of digital information data constituting symbols which are included in said plurality of blocks in a second direction in said blocks of digital information data;
   forming first code sequences for first error detection from said first digital information data groups and said first redundancy data;
   forming second code sequences for second error detection from said second digital information data group and said second redundancy code;
   transmitting blocks including at least one of said digital information data and said first redundancy data; and
   transmitting blocks including said second redundancy data.

2. An encoding method according to claim 1; in which the step of generating said first redundancy data includes the step of generating said first redundancy data for respective error correction codes.

3. An encoding method according to claim 2; in which the step of generating said first redundancy data includes the step of generating a plurality of error check symbols.

4. An encoding method according to claim 1; in which the step of generating said second redundancy data includes the step of generating said second redundancy data for respective error correction codes.

5. An encoding method according to claim 4; in which the step of generating said second redundancy data includes the step of generating a plurality of error check symbols.

6. An encoding method according to claim 1; in which the step of arranging said plurality of symbols includes the steps of arranging only even or odd numbered symbols into blocks of a first kind and arranging only the other into blocks of a second kind, and the step of generating second redundancy data includes the step of producing said second redundancy data from digital information data constituting symbols included in said blocks of the first and second kinds.

7. An encoding method according to claim 6; in which the step of transmitting said blocks comprising said digital information data and/or said first respective redundancy data includes the steps of individually transmitting said blocks of the first kind and individually transmitting said blocks of the second kind.

8. An encoding method according to claim 7; in which the blocks which include said second redundancy data produced from said blocks of the first kind are transmitted before said blocks of the first kind, and the blocks which include said second redundancy data produced from said blocks of the second kind are transmitted after said blocks of the second kind.

9. An encoding method according to claim 7; in which the blocks which include said second redundancy data produced from said blocks of the first kind are transmitted after said blocks of the first kind, and the blocks which include said second redundancy data produced from said blocks of the second kind are transmitted before said blocks of the second kind.

10. An encoding method according to claim 7; in which the step of producing said second redundancy data includes the steps of:
producing one half of said blocks consisting of said second redundancy data from said digital information data constituting symbols comprising said blocks of the first kind; and
producing the other half of said blocks consisting of said second redundancy data from said digital information data constituting symbols comprising said blocks of the second kind.

11. An encoding method according to claim 7; in which said digital information data is a two channel audio signal and including the further steps of:
arranging a substantially equal number of said synbols comprising said digital information data provided by each said channel in said code sequence of said first redundancy data; and
arranging a substantially equal number of said symbols comprising said digital information data provided by each channel in said code sequences of said second redundancy data, thereby preventing a concentration of errors in one of said channels.

12. An encoding method according to claim 11; in which the steps of transmitting said blocks include the steps of:
transmitting said second redundancy data blocks produced from said blocks of the first kind after said blocks of the first kind; and
transmitting said second redundancy data blocks produced from said blocks of the second kind before said blocks of the second kind.

13. An encoding method according to claim 11; in which the steps of transmitting said blocks include the steps of:
transmitting said second redundancy data blocks produced from said blocks of the first kind before said blocks of the first kind; and
transmitting said second redundancy data blocks produced from said blocks of the second kind after said blocks of the second kind.

14. An encoding method according to claim 6; in which the step of arranging said symbols includes the step of arranging said symbols composed of the same word of said digital information data in the same first code sequence of said first redundancy data.

15. An encoding method according to claim 6; including the further step of forming each of said blocks to include a block sync signal, a segment address, a block address, a CRC code, said digital information data and redundancy data.

16. An encoding method according to claim 1; in which the steps of forming said first and second code sequences includes the steps of forming said first and second code sequences of equal length.

17. An encoding method according to claim 1; in which the steps of forming said first and second code sequences existing in at least two blocks of said plurality of blocks includes the steps of including at least two adjacent blocks.

18. An encoding method according to claim 17; further including the steps of:
arranging adjacent words of said digital information data in separate first code sequences of said first error correction code; and
arranging adjacent words of said digital information data in separate second code sequences of said second error correction code.

19. An encoding method according to claim 17; including the further steps of:
arranging adjacent words of said digital information data in separate code sequences of said first error correction code;
arranging adjacent words of said digital information data in separate code sequences of said second error correction code; and
arranging correction parity symbols of said first error correction code inonly one of said at least two blocks in which said code sequence of said first error correction code exists.

* * * * *